United States Patent [19]

Irwin

[11] Patent Number: 5,346,985
[45] Date of Patent: Sep. 13, 1994

[54] DRAWABLE HIGH TENSILE STRENGTH ARAMIDS

[75] Inventor: Robert S. Irwin, Wilmington, Del.

[73] Assignee: E. I. Du Pont de Nemours and Company, Wilmington, Del.

[21] Appl. No.: 772,383

[22] Filed: Sep. 30, 1991

[51] Int. Cl.$^5$ .............. C08G 69/26; C08G 69/32; C08G 69/40

[52] U.S. Cl. .............. 528/331; 252/183.11; 528/338; 528/339

[58] Field of Search .............. 252/1, 182.15, 183.11; 264/DIG. 29; 528/318, 324, 328, 329.1, 335, 338, 339, 331

[56] References Cited

U.S. PATENT DOCUMENTS

| | | | |
|---|---|---|---|
| 3,063,966 | 11/1962 | Kwolek et al. | 528/339 X |
| 3,354,127 | 11/1967 | Hill, Jr. et al. | 528/339 |
| 3,671,542 | 6/1972 | Kwolek | 524/104 X |
| 4,308,311 | 12/1981 | Ogawa et al. | 428/215 |
| 4,384,107 | 5/1983 | Rogers et al. | 528/183 |
| 4,461,886 | 7/1984 | Rogers et al. | 528/331 |
| 4,507,467 | 3/1985 | Shimada et al. | 528/348 |
| 4,843,141 | 6/1989 | Gaudiana et al. | 528/183 |
| 4,962,181 | 10/1990 | Vora | 528/335 X |
| 4,987,215 | 1/1991 | Keil et al. | 528/329.1 |
| 4,987,216 | 1/1991 | Keil et al. | 528/329.1 |
| 5,003,036 | 3/1991 | Bowen et al. | 528/339 X |
| 5,177,175 | 1/1993 | Kiriyama et al. | 528/339 X |

FOREIGN PATENT DOCUMENTS

53-143726 12/1978 Japan .

OTHER PUBLICATIONS

H. W. Schmidt and D. Guo, *Makromol. Chem.*, vol. 189, pp. 2029–2037 (1988).

*Primary Examiner*—Richard D. Lovering
*Attorney, Agent, or Firm*—Susan Borden Evans

[57] ABSTRACT

Aramids, which in the drawn state have high tensile strengths tensile elongations, and tensile moduli, are made from units derived from selected 2,2'-disubstituted-4,4'-bibenzoic acids, 3,4'-oxydibenzoic acid or 3,4'-dicarboxybenzophenone, p-phenylenediamine, and optionally terephthalic acid. The aramids are useful for ropes and composites.

16 Claims, No Drawings

DRAWABLE HIGH TENSILE STRENGTH ARAMIDS

FIELD OF INVENTION

Aramid polymers whose fibers and films are drawable and after drawing possess a combination of very high tensile strength, tensile elongation and modulus, are provided.

TECHNICAL BACKGROUND

It is well known in the art that the essence of high fiber tensile strength and modulus is the capability of macromolecules, of adequately high molecular weight, to adopt a fully extended (rod-like) conformation and good parallelization (orientation) with respect to the fiber axis. With fairly stiff-chain para-aramids, exemplified by poly(p-phenyleneterephthalamide) (PPD-T), good orientation is accomplished by virtue of the ability of precursor liquid crystalline spinning solutions to become well oriented on extrusion through a spinneret and prior to coagulation. Fibers thus formed are not capable of significant draw-orientation, although modulus, and sometimes, to a lesser extent, tenacity may be improved by heat-treatment under tension, which is in effect a crystallization process. A second route to oriented aramid fibers of high strength and modulus is by choice of a semi-flexible composition such that, while it cannot form ordered, liquid crystalline solutions, an initially amorphous as-spun fiber may be very highly stretched at elevated temperature to bring the chains into good alignment. These are typically random copolymers which are non-crystalline in the drawn state. Random copolymers based on the corresponding diacid, 3,4'-oxydibenzoic acid (3,4'-ODB) have been disclosed in a general way, e.g., as part of a large number of possibilities for combining certain cited monomers (Japanese Patent Application 78-143726), or as within the description of a generalized formula (H. Sasaki et al., U.S. Pat. No. 4,507,467). Such drawable copolymers generally do not have the capability for substantial crystallization, which is known, as cited earlier, to enhance orientation which is a major prerequisite for maximization of fiber strength. Herein is disclosed copolymer based on 3,4'-oxydibenzoic acid and selected, substituted bibenzoic acids, and p-phenylenediamine, which can be highly drawn to provide large improvements in tensile strength and modulus, and which are substantially crystalline with an unusually high level of orientation. The crystallite regions are novel in that both diacid units are isomorphously incorporated therein, as indicated by a unique copolymer diffraction pattern.

H. W. Schmidt and D. Guo, Makromol. Chem., vol. 189, p. 2029-2037 (1988) report the use of 2,2'-dimethyl-4,4'-bibenzoic acid units in an aromatic polyester. No mention is made of the use of this compound in an aramid.

U.S. Pat. Nos. 4,384,107 and 4,461,886 disclose aramids containing either stilbinyl and/or biphenylyl units. Among the possible biphenylyl type units are those derived from 2,2'-disubstituted-4,4'-bibenzoic acid, and specifically mentioned substituents are chloro, bromo, nitro and methyl. No mention is made of the use of other units claimed herein in a random copolymer.

U.S. Pat. No. 4,843,141 discloses polyesteramides containing units derived from 2,2'-disubstituted-4,4'-bibenzoic acid, an aromatic aminophenol, and optionally an aromatic diacid, such as terephthalic acid, and also optionally an aromatic hydroxy acid or amino acid. Specifically mentioned substituents include chloro, bromo, nitro and methyl. No mention is made of the use of these bibenzoic acids in aramids (as opposed to polyesteramides).

SUMMARY OF THE INVENTION

A drawable aramid is provided which consists essentially of up to about 10 mole percent of first units derived from p-phenylenediamine (PPD) and terephthalic acid (T), about 30 to about 70 mole percent of second units derived from 2,2'-disubstituted bibenzoic acid and PPD, and about 70 to about 30 mole percent of units derived from ODB and PPD ("third units" herein). Such polymers, especially in fiber or film form, may be drawn to give highly oriented crystalline materials with much improved tensile strength, as well as high tensile modulus at a high elongation

DETAILS OF THE INVENTION

This invention concerns a drawable aramid, consisting essentially, of up to about 10 mole percent of a first unit of the formula

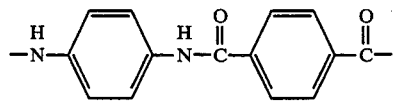

about 30 to about 70 mole percent of a second unit of the formula

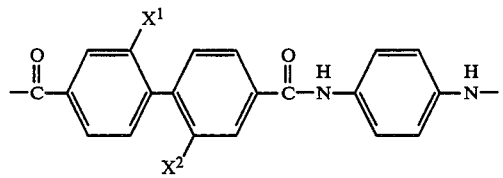

and about 70 to about 30 mole percent of a third unit of the formula

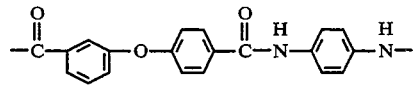

wherein $X^1$ and $X^2$ are independently selected from the group consisting of chlorine, bromine, nitro and methyl.

It is preferred if the polymer contains about 35 to about 65 mole percent of second units and about 65 to about 35 mole percent of third units. It is more preferred if the polymer contains about 45 to about 55 mole percent of second units and about 55 to about 45 mole percent of third units. It is also preferred that the first units should not exceed about 5 mole percent.

It is also preferred if $X^1$ and $X^2$ are identical. It is more preferred if each $X^1$ and $X^2$ is chlorine or methyl and especially preferred if $X^1$ and $X^2$ are chlorine.

The 2,2'-disubstituted-4,4'-bibenzoic acids (or their acid halides, especially chlorides, which are often used in the polymerization process to make aramids) may be made by methods known to those skilled in the art. Synthesis of the acyl chlorides of 2,2'-dibromo- and 2,2'-dinitro-4,4'-bibenzoic acids are described in U.S. Pat. No. 4,384,107. Synthesis of the corresponding 2,2'-dimethyl compound is described in H. Schmidt and D. Guo, Makrotool. Chem., vol. 189, p. 2029–2037 (1988). 2,2'-Dichloro-4,4'-dicyanobiphenyl may be made by the procedure described in U.S. Pat. No. 3,872,094 and then hydrolyzed in refluxing (atmospheric pressure) 20% aqueous NaOH, and then neutralized with acid to obtain 2,2'-dichloro-4,4'-bibenzoic acid.

3,4'-Oxydibenzoic acid can be made by the method of M. H. B. Skovby, et. al., J. Polym. Sci., Part A: Polym. Chem., vol. 28, p. 75–87.

The polymers may be made by techniques that are known for making prior art aramids, for example see British Patent 1,547,802 and U.S. Pat. No. 3,673,143. The polymers, as made, should be of sufficient molecular weight so that fiber or films may be formed. The polymers should have an inherent viscosity of about 2 or more. Such polymers may be spun into fibers or made into other shapes by methods known for prior art aramids, see for example U.S. Pat. No. 3,673,143, Example 2, for forming a film, and U.S. Pat. No. 3,767,756, for spinning a fiber.

The instant polymers, are drawable, and upon drawing exhibit greatly improved properties compared with undrawn polymer, particularly tensile modulus. In order for aramid polymers to be drawable, and upon drawing to exhibit optimal physical properties, it is believed, but Applicant does not wish to be bound by the hypothesis, that aramid polymers must have the following intrinsic properties: that they be soluble in a solvent for fiber spinning; that they be stable under the drawing conditions (especially high temperature); that they be largely amorphous in the as-spun (undrawn) state; and that they preferably exhibit significant crystallinity and high orientation in the drawn state. Stretching of film strips provides an indication that a polymer will conform to these criteria. The polymers are soluble in N-alkylamide solvents, such as N-methylpyrrolidone. While many aramids may meet some of these conditions, Applicant believes that only a small fraction of all aramid polymers theoretically possible would meet all these conditions.

The drawable polymers of this invention are useful in fibers and films where high tensile strength and tensile modulus are important, and for ropes and composites.

The preferred temperature for drawing is about 350° C. to about 575° C., most preferably about 400° C. to about 520° C. The temperature needed for any particular aramid can be readily determined by heating the aramid (say a film or fiber) to a given temperature and trying to draw by hand (see Example 1). If no draw is apparent higher temperatures should be tried.

The force needed to draw the fiber is determined by relatively easy experimentation. The aramid can be drawn to a specific draw value, provided that the aramid does not break at that amount of draw. Alternatively the aramid can be drawn by a certain force (but less than that required to break the aramid). This force can be readily determined for any aramid and temperature by heating the aramid to drawing temperature and applying just enough force to draw it while measuring the force with a tension gauge.

By the phrase "drawn at least X%" is meant the value computed by the following formula:

$$\frac{\text{(final length)} - \text{(original length)}}{\text{original length}} \times 100$$

It is preferred if the aramid is drawn at least 3%, more preferred if the aramid is drawn at least about 4%, and most preferred if the aramid is drawn at least about 6%. It is also preferred if the aramid is drawn at least about 400%. It is also preferred if the tensile strength of the drawn aramid is at least 1.25 times the tensile strength of the undrawn aramid.

It is preferred if the orientation angle is 12° or less, preferably 10° or less, more preferably 8° or less. The orientation angle may be measured (in fibers) by the following method:

A bundle of filaments about 0.5 nun in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film, in a Warhus pinhole camera. Collimators in the camera are 0.64 nun in diameter. The exposure is continued for about fifteen to thirty minutes (or generally long enough so that the diffraction feature to be measured is recorded at an optical density of -1.0).

A digitized image of the diffraction pattern is recorded with a video camera. Transmitted intensities are calibrated using black and white references, and gray level (0–255) is converted into optical density. The diffraction pattern of fibers of this invention has two prominent overlapping equatorial reflections at a scattering angle of approximately 20° and 22°; the inner (~20°) reflection is used for the measurement of Orientation Angle. A data array equivalent to an azimuthal trace through the two selected equatorial peaks (i.e. the inner reflection on each side of the pattern) is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak (with interpolation being used, that is not an integral number). Both peaks are measured and the Orientation Angle is taken as the average of the two measurements.

It is preferred if the apparent crystallite size of the drawn aramid is at least 35 Angstroms, preferably at least about 45 Angstroms, and more preferably 55 Angstroms. Apparent crystallite sizes of 35 Angstroms or larger are believed to denote significant crystallinity in the aramid, and an improvement in properties, especially tensile modulus. The apparent crystallite size is measured by the following procedure:

Apparent Crystallite Size is derived from X-ray diffraction scans, obtained with an X-ray diffractometer (Philips Electronic Instruments; cat. no. PW1075/00) in reflection mode, using a diffracted-beam monochromator and a scintillation detector. Intensity data are measured with a rate meter and recorded by a computerized data collection and reduction system. Diffraction scans are obtained using the instrumental settings:
Scanning Speed: 1° 2θ per minute
Stepping Increment: 0.025° 2θ
Scan Range: 15° to 30° 2θ
Pulse Height Analyzer: Differential
Diffraction data are processed by a computer program that smooths the data, determines the baseline, and measures peak locations and heights.

The diffraction pattern of fibers from this invention is characterized by two prominent equatorial X-ray reflections. These peaks, occurring at approximately 20°–21° and 22° 2θ (scattering angle), overlap substantially and may be difficult to resolve. Apparent Crystallite Size is calculated from the measurement of the half-height peak width of the first (lower scattering angle) equatorial diffraction peak. Because the two equatorial peaks overlap, the measurement of the half-height peak width is based on the half-width at half-height. For the 20°–21° peak, the position of the half-maximum peak height is calculated and the 2θ value corresponding to this intensity is measured on the low angle side. The difference between this 2θ value and the 2θ value at maximum peak height is multiplied by two to give the half-height peak (or "line") width.

In this measurement, correction is made only for instrumental broadening; all other broadening effects are assumed to be a result of crystallite size. If B is the measured line width of the sample, the corrected line width $\beta$ is $$\beta = (B^2 - b^2)^{\frac{1}{2}}$$

where 'b' is the instrumental broadening constant. 'b' is determined by measuring the line width of the peak located at approximately 28.5° 2θ in the diffraction pattern of a silicon crystal powder sample.

The Apparent Crystallite Size is given by $$ACS = (K\lambda)/(\beta \cdot \cos \theta),$$

wherein
K is taken as one (unity)
λ is the X-ray wavelength (here 1.5418 Å)
β is the corrected line breadth in radians
θ is half the Bragg angle (half of the 2θ value of the selected peak, as obtained from the diffraction pattern).

It is preferred if the drawn aramid consists essentially of about up to 10 mole percent of a first unit of the formula

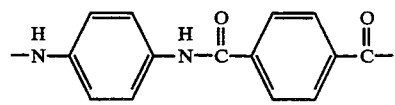

about 30 to about 70 mole percent of a second unit of the formula

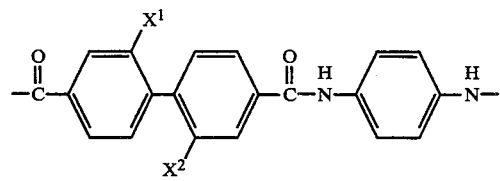

and about 70 to about 30 mole percent of a third unit of the formula

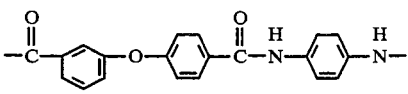

wherein
$X^1$ and $X^2$ are independently selected from the group consisting of chlorine, bromine, nitro and methyl.

Preferred compositions of aramids of this formula are as enumerated above.

The drawing of aramids in the present invention occurs in the substantial absence of water or other solvents. By substantial absence of water or other solvent is meant less than about 5% water or other solvent, preferably less than about 2%. The molecular weight of the aramids should be high enough to be able to form a fiber.

Polymers should have an inherent viscosity of about 2 or more in N-methylpyrrolidone. A procedure for measuring inherent viscosity is given in U.S. Pat. No. 3,673,143, column 17, lines 10 et. seq., which is hereby included by reference.

It is preferred if the aramid before drawing has an apparent crystallite size of 30 Angstroms or less. This means that the apparent crystallite size will increase during the drawing process.

The apparatus useful for drawing the aramids may be quite varied. It may even be done by hand, but for production more automated continuous processes are desirable. Apparatus useful for such processes are disclosed in U.S. Pat. Nos. 3,869,430 and 4,500,278, which are hereby included by reference.

In the following examples, fiber properties are measured by methods described in U.S. Pat. No. 3,869,429, column 10 line 28 to column 11, line 10, which is hereby included by reference. Orientation angles and apparent crystallite sizes were measured as described supra.

EXAMPLES

Example 1

In a glass resin kettle fitted with an air-drawn stirrer, a slow supernatant flow of dry inert gas to exclude atmospheric moisture, provision for solids addition, and provision for external ice-water cooling, p-phenylenediamine (6.048 g; 0.058 mole) was dissolved in dry N-methylpyrrolidone (NMP) (223 ml; 230 g) containing anhydrous CaCl$_2$ (6.7 g; 3%). This stirred solution was cooled to 5°–10° C., whereupon a solid mixture of 2,2'-dichlorobibenzoylchloride (9.744 g; 0.029 mole) and 3,4'-oxydibenzoylchloride (8.260 g; 0.029 mole) was quantitatively added all at once. Viscosity increased progressively during about 30 min to a level suitable for casting films (7.9% solids). CaO (3.14 g; 0.058 mole) was added after about 2 hr to neutralize byproduct HCl and provide a clear, viscous solution. Inherent viscosity measured in NMP at 30° was 3.88, in 100% H$_2$SO$_4$ it was 2.40. Thermogravimetric analysis indicated incipient weight loss at about 450° C.; DSC indicated concurrent exotherms beginning at the same temperature.

The polymer solution was cast as films onto clean glass plates using a 0.015" doctor's knife. These were dried 5 hr/90° C. in a vacuum oven under a bleed of nitrogen, then soaked overnight in water at room temperature to extract CaCl$_2$. The film was then clamped at the edges to the plate and dried 5 hr at 90° C. It was then cut into strips ¼" wide which were stretched by hand over a semicircular hot plate of diameter 1" and contact length about 1.5". Drawability varied from 400%/400° C. to 600%/440° C. to 900%/460° C. By staging the draw at a series of increasing temperatures up to 450° C., drawability of 800% was possible. The inability to draw at high temperatures than 450° C. because of excessive weakness of the film, coincided with the onset of thermolytic decomposition. The staged draw gave maximal tensile strength: T/E/Mi/denier=8.4 gpd/2.7%/365 gpd/381 (average 8.1/2.8/300/407). The undrawn specimen had T/E/Mi=1.1/29/30, was amorphous and totally unoriented. The drawn specimens by contrast were highly crystalline and highly oriented with apparent crystallite size of 53Å and orientation angle of 4.8°.

The undrawn polymer had an apparent crystallite size of 8Å and an orientation angle of zero.

COMPARATIVE EXAMPLE 1 p-Phenylenediamine/3,4'-oxydianiline (50/50) terphthalamide polymer of $\eta$inh=3.01 made by a precisely analogous (to Example 1) polymerization, cast as film, and strips drawn as before. 450–1550% drawability was observed in the 400°–490° C. range. As an example, specimens drawn 1500% at 475° C. had T/E/Mi average values of 14.7 gpd(18.4 gpd)/4.1%(4.5%)/384 gpd(598)/110 den with an orientation angle of 11.4° and negligible three-dimensional crystallinity as Judged by the absence of well-defined diffraction spots in the X-ray diffractograms. Apparent crystallite size measured on commercial fiber speciments of this composition was 33Å with an orientation angle of 15°.

COMPARATIVE EXAMPLE 2

As in the manner of Example 1, 7.56 g p-phenylenediamine (0.07 mole) was dissolved in 309 ml dry NMP (300 g) containing 2.25 g dissolved anhydrous CaCl$_2$ (0.75% w/w solution) at 10° C. this solution was combined with 7.10 g terephthaloyl chloride (0.035 mole) and 10.33 g 3,4'-oxydibenzoyl chloride (0.035 mole). The mixture was heated to 70° C. and polymerization, with stirring, continued 2 hr to give a lemon yellow solution, which was milky and slightly viscous. By-product HCl was neutralized by mixing in 3.85 g CaO (0.07 mole) to provide a clear viscous solution. Inherent viscosity was 2.00 in 100% sulfuric acid at 5° C. Dilution with NMP provided a consistency suitable for casting films as in the manner of Example 1. Films were cast as in Example 1 and drawn over a hot shoe a maximum of 700% at 400° C. to provide tenacity (T) /elongation (E)/modulus (Mi) of 11 gpd/6.0%/323 gpd (with best break of 12.3/10.2/378). For a similar specimen drawn maximally 950% the orientation angle (O.A.)/crystal index (C.I.)/crystal size (C.S.) were 13°/22/42Å. The crystal diffraction pattern was identical to that of PPD-T. At a lower draw ratio of 800% O.A./C.I./C.S. were 15°/20/35Å. Undrawn film had values of nil/12/10Å and T/E/Mi-1.2/79/31 gpd.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A drawable aramid random copolymer, consisting essentially of, of up to about 10 mole percent of a first unit of the formula

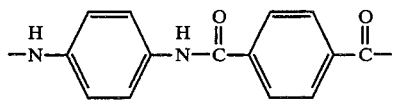

about 30 to about 70 mole percent of a second unit of the formula

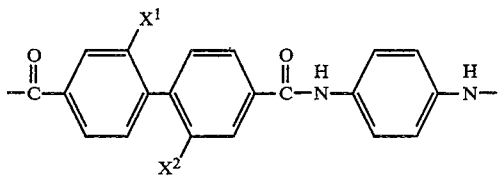

and about 70 to about 30 mole percent of a third unit of the formula

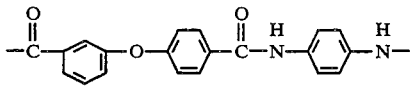

wherein
$X^1$ and $X^2$ are independently selected from the group consisting of chlorine, bromine, nitro and methyl.

2. An aramid as recited in claim 1 which contains about 35 to about 65 mole percent of said second units and about 65 to about 35 mole percent of said third units.

3. An aramid as recited in claim 2 which contains about 45 to about 55 mole percent of said second units and about 55 to about 45 mole percent of said third units.

4. An aramid as recited in claim 3 wherein each said $X^1$ and said $X^2$ are chlorine or methyl.

5. An aramid as recited in claim 4 which is drawn.

6. An aramid as recited in claim 4 wherein said $X^1$ and said $X^2$ are chlorine.

7. An aramid as recited in claim 2 wherein said $X^1$ and said $X^2$ are identical.

8. An aramid as recited in claim 2 wherein each said $X^1$ and $X^2$ are chlorine or methyl.

9. An aramid as recited in claim 2 that is drawn.

10. An aramid as recited in claim 1 wherein said $X^1$ and said $X^2$ are identical.

11. An aramid as recited in claim 10 wherein each said $X^1$ and said $X^2$ are chlorine or nitro.

12. An aramid as recited in claim 10 wherein $X^1$ and said $X^2$ are chlorine.

13. An aramid as recited in claim 1 that is drawn.

14. An aramid as recited in claim 1 in the form of a fiber.

15. An aramid as recited in claim 1 in the form of a film.

16. An aramid as recited in claim 1 which contains up to about 5% of said first units.

* * * * *